United States Patent
Bublewitz et al.

(10) Patent No.: US 7,335,708 B2
(45) Date of Patent: Feb. 26, 2008

(54) ADDITION CROSS-LINKING TWO-COMPONENT SILICONE MATERIALS WITH A HIGH SHORE D HARDNESS

(75) Inventors: Alexander Bublewitz, Herborn (DE); Jens-Peter Reber, Meinerzhagen (DE); Ulrich Nagel, Tübingen (DE)

(73) Assignee: Kettenbach GmbH & Co. KG, Eschenburg (DE)

( * ) Notice: Subject to any disclaimer, the term of this patent is extended or adjusted under 35 U.S.C. 154(b) by 0 days.

(21) Appl. No.: 10/503,412

(22) PCT Filed: Nov. 29, 2003

(86) PCT No.: PCT/EP03/13474

§ 371 (c)(1),
(2), (4) Date: Aug. 3, 2004

(87) PCT Pub. No.: WO2004/052994

PCT Pub. Date: Jun. 24, 2004

(65) Prior Publication Data

US 2005/0159522 A1  Jul. 21, 2005

(30) Foreign Application Priority Data

Dec. 12, 2002 (DE) ............................... 102 57 935
Dec. 23, 2002 (DE) ............................... 102 61 917

(51) Int. Cl.
*C08L 83/04* (2006.01)
*A61K 6/08* (2006.01)

(52) U.S. Cl. ............ 525/477; 524/588; 525/478; 528/15; 528/31; 528/32; 523/115; 523/116

(58) Field of Classification Search ............ None
See application file for complete search history.

(56) References Cited

U.S. PATENT DOCUMENTS 5,596,025 A * 1/1997 Oxman et al. ............... 523/109
5,718,586 A * 2/1998 Sharp et al. ................. 433/214
6,313,190 B1 * 11/2001 Bublewitz et al. ........... 523/109

FOREIGN PATENT DOCUMENTS

| | | |
|---|---|---|
| DE | 2646726 | 4/1978 |
| EP | 0522341 | 1/1993 |
| EP | 695 787 A2 * | 7/1995 |
| EP | 0894117 | 2/1999 |

* cited by examiner

Primary Examiner—Marc S. Zimmer
(74) Attorney, Agent, or Firm—Collard & Roe, P.C.

(57) ABSTRACT

The present invention relates to an addition-cross-linking two component silicone material containing one or more organopolysiloxanes having at least two vinyl groups in the molecule, at least one cross-linking agent and at least one catalyst, wherein the material contains more than 1 wt %, relative to the total quantity of the two-component silicone material, of at least one organopolysiloxane of general formula I $$CH_2=CH-SiR^1R^2O-(SiR^1R^2O)_n-SiR^1R^2-CH=CH_2,$$

in which $R^1$ and $R^2$ are identical or different and are selected from the group comprising alkyl groups, aryl groups, aralkyl groups, halogen-substituted alkyl groups, halogen-substituted aralkyl groups, cyanoalkyl groups, cycloalkyl groups and cycloalkenyl groups, and n is an integral number between 1 and 9, as well as to the use of this silicone material.

30 Claims, No Drawings

ADDITION CROSS-LINKING TWO-COMPONENT SILICONE MATERIALS WITH A HIGH SHORE D HARDNESS

CROSS REFERENCE TO RELATED APPLICATIONS

Applicants claim priority under 35 U.S.C. §119 of German Applications Nos. 102 57 935.0 filed on Dec. 12, 2002 and 102 61 917.4 filed on Dec. 23, 2002. Applicants also claim priority under 35 U.S.C. §365 of PCT/EP2003/013474 filed on Nov. 29, 2003. The international application under PCT article 21(2) was not published in English.

The present invention relates to an addition-cross-linking two component silicone material containing at least one organopolysiloxane having at least two vinyl groups in the molecule or a mixture of two or more organopolysiloxanes, each having different chain length and each having at least two vinyl groups in the molecule, as well as at least one organohydropolysiloxane having two or more SiH groups in the molecule and at least one catalyst. In addition, the present invention relates to the use of these addition-cross-linking two-component silicone materials.

By virtue of their practical technological properties of having both a high final hardness and a low elastic deformability, such two-component silicone materials are used in various applications, such as in dental medicine and dental technology for keying, fixation, positioning, restoration, transfer, remounting and bite registration. In bite registration in particular, in which the positional relationship of the two jaws relative to one another must be fixed accurately in the bite-registration material, high final hardness of the material is critical to good machinability of the material with a cutter or scalpel, as is a low elasticity, to ensure that excess material can be broken off selectively. Aside from the foregoing, the materials must exhibit the smallest possible percentage shrinkage during curing, in order to ensure accurate reproduction of the jaw relationships. In addition, the materials must exhibit the shortest possible setting time, in order to avoid deviations due to relative movements of the jaw in the patient's mouth. On the other hand, the processing time must be at least 15 to 30 seconds, in order to permit the dentist to apply the material onto the occlusion surface of the lower jaw.

Known addition-cross-linking two-component silicone materials contain at least one relatively long-chain organopolysiloxane, an organohydropolysiloxane as cross-linking agent and a catalyst. To adjust the desired setting time, short-chain organopolysiloxanes are usually also added thereto to act as inhibitors of the hydrosilylation reaction and thus to prevent the material from curing too rapidly. In addition, these materials traditionally contain fillers in order to increase the final hardness of the cured compositions.

From German Patent 2646726 A1 there is known, for regulating the rate of cross-linking of addition-cross-linking silicone materials, a method in which, before the components are mixed, at least one short-chain organopolysiloxane of general formula

in which R denotes identical or different univalent hydrocarbons that are free of aliphatic multiple bonds and that may or may not be substituted, and n is equal to 0 or denotes an integral number between 1 and 6 is added to the two-component material containing a long-chain organopolysiloxane having aliphatic multiple bonds in the molecule and also containing fillers, cross-linking agents and catalyst.

Therein the short-chain organopolysiloxanes act as inhibitors of the hydrosilylation reaction and accordingly slow the cross-linking between the long-chain organopolysiloxane having aliphatic multiple bonds and the organohydropolysiloxane. In order to avoid excessive inhibition of the hydrosilylation reaction, the content of inhibitor must not exceed 5,000 ppm by weight, corresponding to 0.5 wt %, relative to the total weight of all organosilicon compounds used.

In European Patent 0522341 A1 there are disclosed polysiloxane-base addition-cross-linking compositions which contain, besides organopolysiloxanes having two or more vinyl groups in the molecule and a viscosity of between 100 and 200,000 mPa·s, besides organohydropolysiloxanes, besides catalysts and dyes, compounds of highly disperse active fillers in silicone oil and short-chain organopolysiloxanes having two or more vinyl groups in the molecule. The short-chain organopolysiloxanes correspond to the general formula

in which R denotes identical or different univalent hydrocarbons that are free of aliphatic multiple bonds and that may or may not be substituted, and n denotes an integral number between 10 and 20.

In contrast to the inhibitors, described in German Unexamined Application 2646726, having a chain length n of between 0 and 6, the organopolysiloxanes cited in the foregoing, in which n is between 10 and 20, are not supposed to have an inhibiting effect up to a proportion of at most 8 wt % relative to the total weight of the composition. However, the silicone materials disclosed in European Patent 0522341 A1 have a Shore A hardness of only 78 at most, corresponding to a Shore D hardness of 19 at most, and a modulus of elasticity of 9 MPa at most. Nevertheless, these mechanical characteristics are inadequate for most applications in dental medicine and dental technology, especially for bite registration.

In European Patent, 0894117 B1 there are described addition-cross-linking two-component silicone materials that contain organopolysiloxanes having two vinyl groups in the molecule, organohydropolysiloxanes having two or more SiH groups and an SiH content of 1 to 15 mmol/g as cross-linking agent, a catalyst, reinforcing fillers and non-reinforcing fillers, wherein the organopolysiloxane having two vinyl groups in the molecule has a viscosity of between 21 and 99 mPa·s, corresponding to a chain length of about 21 to 69. For regulation of the rate of cross-linking, there can be added to these materials the inhibitors disclosed in German Patent 2646726 A1 in a proportion of up to 1 wt % relative to the total weight of the silicone material. These cured compositions have a Shore D hardness of at least 35 and a modulus of elasticity of higher than 20 MPa (measured according to DIN 53457 or 53455). Such values are already very good for most applications in dental medicine and dental technology. Nevertheless, materials with even higher mechanical strength and lower elasticity are desirable for these indications.

The object of the present invention is to provide an addition-cross-linking two-component silicone material which, compared with the known compositions, is distinguished by a higher Shore D hardness and/or a higher modulus of elasticity and, in terms of the other practical technological properties, especially percentage shrinkage as well as setting time, is at least comparable with those known compositions.

This object is achieved according to the invention by an addition-cross-linking two-component silicone material having the composition according to claim 1.

As an organopolysiloxane within the meaning of the present invention there is understood not only a plurality of molecularly uniform polymer molecules, or in other words a substance composed exclusively of organopolysiloxane molecules of identical chain length, but also a mixture of polymer homologs of various degrees of polymerization. In the latter case, the cited chain length corresponds to that of the quantitative main constituent. An organopolysiloxane of general formula I having a chain length of n=3 within the meaning of the present invention therefore contains exclusively molecules with this chain length or is composed of a mixture of molecules having identical groups but different chain lengths, while the proportion of molecules having a chain length of n=3 represents the largest value relative to the total number of molecules contained in the mixture.

Surprisingly, it has been found in connection with the present invention that organopolysiloxanes of general formula I

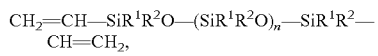
$$CH_2=CH-SiR^1R^2O-(SiR^1R^2O)_n-SiR^1R^2-CH=CH_2,$$

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n is an integral number between 1 and 9, which preferably have a vinyl content of 0.7 to 10, particularly preferably of 0.8 to 9 mmol/g, in no way have an inhibiting effect on the hydrosilylation reaction; it is exclusively organopolysiloxanes of the said general formula with n equal to zero that have such an effect. According to the knowledge of the present invention, the inhibition of the cross-linking reaction described in the prior art takes place only if the starting materials, especially the organopolysiloxanes according to the above formula, also contain one or more organodisiloxanes, especially divinylorganodisiloxanes such as 1,3-divinyldisiloxanes, for example 1,3-divinyltetraalkyldisiloxanes, and 1,3-divinyltetraalkyldisiloxane substructures, which are formed during synthesis of the said organopolysiloxanes as by-products and can be separated only with difficulty by distillation. What is critical for a non-inhibiting effect of the organopolysiloxanes to be used according to the invention is therefore that the two-component silicone material be free or at least substantially free of organodisiloxanes. Preferably, the inventive silicone material has an organodisiloxanes content of less than 0.6 wt %, particularly preferably of less than 0.5 wt %, quite particularly preferably of less than 0.1 wt % and most preferably of less than 0.01 wt %, in each case relative to the total weight of the silicone material. In order to achieve these values, there are preferably used starting materials purified by distillation and/or synthesized by equilibration or condensation of siloxane oligomers/polymers. Preferably the organopolysiloxane or organopolysiloxanes a) has or have two vinyl groups per molecule.

Furthermore, the present invention is based on the knowledge—which is surprising and unexpected for the person skilled in the art—that, by the inventive use of the said short-chain organopolysiloxanes, not only does no inhibition of the hydrosilylation reaction occur, but instead there can be obtained silicone materials that have excellent mechanical characteristics and that furthermore cure in a time that is sufficient for applications in dental medicine and dental technology. Preferably the Shore D hardness of the inventive silicone material in the fully vulcanized condition (24 hours after curing at mouth temperature) is higher than 35, particularly preferably higher than 45 and quite particularly preferably higher than 55, and/or the modulus of elasticity (measured according to DIN 53457 or 53455), is higher than 20 MPa, particularly preferably higher than 50 MPa, and quite particularly preferably higher than 100 MPa.

The modulus of elasticity determined in the 3-point bend test according to ISO 10477 is preferably higher than 20 MPa, particularly preferably higher than 100 MPa and quite particularly preferably higher than 200 MPa. At the same time, the setting time (at mouth temperature) is preferably shorter than 10 minutes and particularly preferably shorter than 5 minutes.

As the moieties $R^1/R^2$ of general formula I there can be used all alkyl groups known to the person skilled in the art, especially methyl, ethyl and isopropyl groups, aryl groups, especially phenyl, naphthyl, tolyl and xylyl groups, aralkyl groups, especially benzyl and phenylethyl groups, halogen-substituted alkyl and aryl groups, especially 3,3,3-trifluoropropyl, chlorophenyl and difluorophenyl groups, cyanoalkyl groups, cycloalkyl groups and cycloalkenyl groups, such as bicyclene or tricyclene.

Preferably the inventive silicone material contains 10 to 90 wt %, particularly preferably 20 to 80 wt % and quite particularly preferably 25 to 50 wt %, relative to the total quantity of the two-component silicone material, of an organopolysiloxane of general formula I.

If the two-component silicone material contains a mixture of two or more organopolysiloxanes, the proportion of organopolysiloxanes of general formula I relative to the total quantity of organopolysiloxanes is preferably at least 30 wt %, particularly preferably at least 50 wt % and quite particularly preferably at least 70 wt %. The remaining proportion can be composed of one or more organopolysiloxanes having two vinyl groups in the molecule and a viscosity of between 100 and 350,000 mPa·s at 20° C. and/or of one or more organopolysiloxanes having two vinyl groups in the molecule according to general formula II

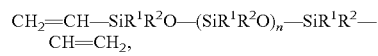
$$CH_2=CH-SiR^1R^2O-(SiR^1R^2O)_n-SiR^1R^2-CH=CH_2,$$

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n is an integral number between 10 and 69.

According to a special embodiment of the present invention, the two-component silicone material contains only one organopolysiloxane, and specifically one that corresponds to general formula I. These silicone materials have particularly high strengths in the fully vulcanized condition, preferably Shore D hardnesses of higher than 50, and/or particularly high moduli of elasticity, preferably of higher than 100 MPa.

According to the invention, the chain length n of the organopolysiloxane or organopolysiloxanes of general formula I is between 1 and 9, regardless of whether one or more organopolysiloxanes are used and regardless of whether one or more other organopolysiloxanes are used besides one or more organopolysiloxanes of general formula I. Preferably the chain length n of the organopolysiloxane or organopolysiloxanes of general formula I is between 1 and 7, particularly preferably between 1 and 5 and quite particularly preferably between 1 and 3.

Silicone materials with particularly good practical technological properties are obtained when the inventive addition cross-linked two-component silicone material contains, as the organopolysiloxane according to general formula I, one or more of the following compounds:

1.
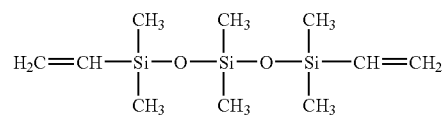

2.
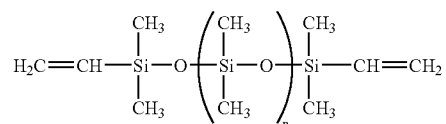

with n between 1 and 9,

3.
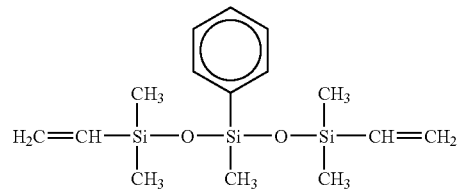

4.
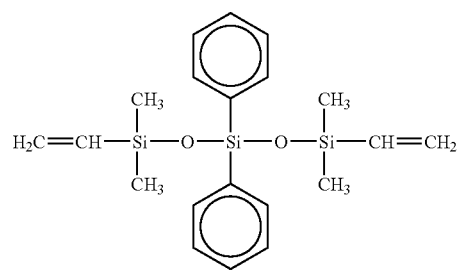

5.
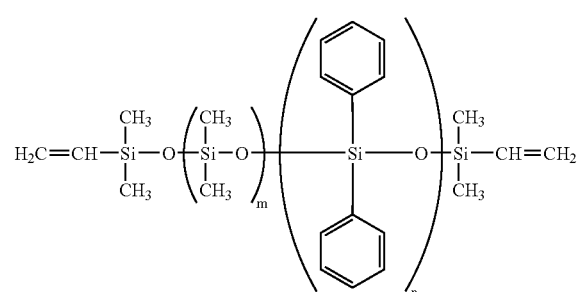

with n between 0 and 9, m between 0 and 9 and n+m between 1 and 9,

6.
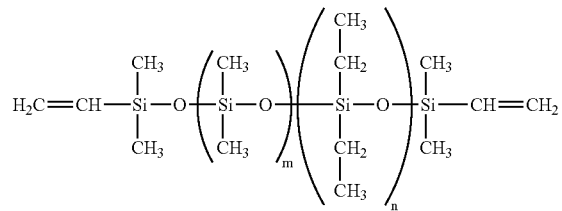

with n between 0 and 9, m between 0 and 9 and n+m between 1 and 9,

7.

$$H_2C=CH-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_m\left(\underset{\underset{CH_3}{|}}{\overset{\overset{\overset{\overset{CF_3}{|}}{CH_2}}{|}}{Si}}-O\right)_n\underset{\underset{CH_3}{|}}{\overset{\overset{CH_3}{|}}{Si}}-CH=CH_2$$

with n between 0 and 9, m between 0 and 9 and n+m between 1 and 9,

8.

$$H_2C=CH-\underset{\underset{CH_3}{|}}{\overset{\overset{CH_3}{|}}{Si}}-O-\underset{\underset{O}{|}}{\overset{\overset{O}{|}}{Si}}-O-\underset{\underset{CH_3}{|}}{\overset{\overset{CH_3}{|}}{Si}}-CH=CH_2$$

with OCH$_3$—C$_6$H$_4$—C(CH$_3$)$_2$—C$_6$H$_4$—O— groups

9.

$$H_2C=CH-\underset{\underset{CH_3}{|}}{\overset{\overset{C_6H_5}{|}}{Si}}-O-\underset{\underset{CH_3}{|}}{\overset{\overset{C_6H_5}{|}}{Si}}-O-\underset{\underset{CH_3}{|}}{\overset{\overset{C_6H_5}{|}}{Si}}-CH=CH_2$$

and

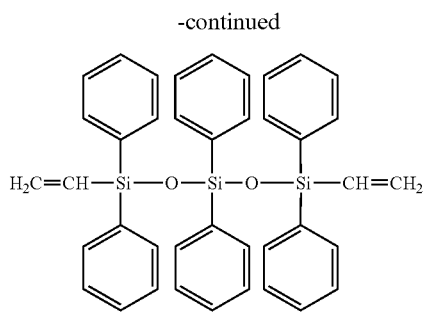

10.

As cross-linking agent the inventive two-component silicone material contains one or more organohydropolysiloxanes (component b); siloxanes that have proved suitable for this purpose include in particular polyalkyl, polyaryl, polyaralkyl, polyhaloalkyl, polyhaloaryl and polyhaloaralkyl siloxanes, which contain at least two, preferably at least three hydrogen atoms bonded to silicon atoms in the molecule. Preferably the organohydropolysiloxane or organohydropolysiloxanes has or have an SiH content of 1 to 15 mmol/g, particularly preferably 4 to 14 mmol/g and quite particularly preferably 5 to 13 mmol/g.

As the catalysts (component c) for hydrosilylation, there can be used all substances known to the person skilled in the art for this purpose, especially salts, complexes and colloidal forms of the transition metals of the $8^{th}$ subgroup, preferably the metals platinum, palladium and rhodium. Particularly preferably the inventive compositions contain as catalysts platinum complexes, which are synthesized from, for example, hexachloroplatinic acid or from corresponding platinum salts. Preferably the catalyst is contained in component B, while the cross-linking agent is contained in component A of the inventive two-component silicone material, in order to avoid premature curing of the material.

Besides at least one organopolysiloxane of general formula I, at least one organohydropolysiloxane, at least one catalyst and possibly one or more longer-chain organopolysiloxanes, the inventive two-component silicone materials additionally contain one or more substances, in each case from one or more of the following groups:
d) reinforcing fillers,
e) non-reinforcing fillers,
f) dyes,
g) moisture binders,
h) inhibitors,
i) vinyl-group-containing and/or SiH-group-containing MQ resins
j) compounds of organopolysiloxanes and reinforcing fillers,
k) surfactants, emulsifiers and/or stabilizers,
l) radioopaque substances,
m) $H_2$-absorbing or adsorbing substances, and substances that eliminate or reduce $H_2$ evolution,
n) compounds that enhance optical readability/scanning.

Depending on their chemical nature, these compounds can be added to component A and/or component B of the inventive two-component silicone material.

Suitable as component d) are in particular highly-disperse, active fillers having a BET surface of at least 50 $m^2/g$, such as titanium dioxide, aluminum oxide, zinc oxide, zirconium oxide and, particularly preferably, wet-precipitated or pyrogenic silicas. The said substances can be used in hydrophilic or hydrophobic form. Furthermore, as reinforcing fillers there can be used nanoparticles and fibrous or lamellar fillers, among which mineral, fibrous fillers such as wollastonite and synthetic, fibrous fillers such as glass fibers, ceramic fibers or plastic fibers are preferred. The term nanoparticles in connection with the present invention denotes specially synthesized inorganic or organic powders, whose mean particle size is smaller than 100 nanometers, but whose composition can be identical to that of conventional materials. The main difference is that, compared with larger particles, nanoparticles have almost as many atoms on the surface as in the interior, and so the properties become increasingly dominated by interfacial effects as the particle size becomes smaller. Thereby nanoparticles acquire useful additional properties, for example in terms of reinforcing properties, light-scattering ability and melting behavior. Nanoparticles can be synthesized by sol/gel technology and precipitation methods as well as by electrochemical processes (EDOC process=electrochemical deposition under oxidizing conditions; SusTech Co.) and plasma processes (plasma and Joule-Thompson quench; NanoProducts Co.).

Furthermore, the inventive compositions can contain one or more non-reinforcing fillers, preferably such having a BET surface of smaller than 50 $m^2/g$ ("Schriftenreihe Pigmente Degussa Kieselsäuren", No. 12, page 5, as well as No. 13, page 3), preferably selected from the group comprising metal oxides, metal hydroxides, metal oxide hydroxides, mixed oxides and mixed hydroxides. Particularly preferred are silicon dioxide, especially in the form of quartz and its crystalline modifications, vitreous fused silica as well as quartz powder, cristobalite, dental glasses, dental ceramics, aluminum oxide, calcium oxide and aluminum hydroxide. There can also be used fillers such as calcium carbonate, kieselguhr, diatomaceous earths and talc, and plastic-base fillers, such as polymethyl methacrylate, polycarbonate, polyvinyl chloride, silicone resin powder, powder based on fluoroorganic compounds as well as organic and inorganic hollow beads, solid beads and fibers. Furthermore, there can also be used solid or hollow plastic particles, which can even have spherical form, for example, and on the surface of which there are embedded inorganic filler particles. Preferably the non-reinforcing fillers used have a mean particle size of $\geq 0.1$ μm (Ullmann's Encyclopedia of Industrial Chemistry, Vol. 21, page 523).

The fillers cited under d) and e) can also be surface-treated (coated). The surface treatment can be performed, for example, with silanes and fatty acids, which may have functional groups (such as vinyl, Si-vinyl, allyl, SiH, acryl and methacryl).

The dyes cited under f) are soluble dyes or pigment dyes. If the inventive silicone materials are being used for applications in dental medicine and dental technology, they preferably contain food dyes and iron oxide dental dyes as the dyes. Furthermore, dye pastes of polysiloxane or mineral-oil dye formulations are suitable for this purpose.

As the moisture binders g) there can be used zeolites, anhydrous aluminum sulfate, molecular sieve, kieselguhr and blue gel.

As inhibitors, the inventive two-component silicone materials can contain all kinds of divinyldisiloxanes of general formula III

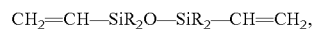

in which R denotes identical or different hydrocarbon moieties that may or may not be substituted, such as alkyl, alkenyl and alkynyl groups.

Particularly preferably, divinyltetraalkyldisiloxanes and divinyltetramethyldisiloxane are used as inhibitors. Alternatively, or in addition, vinyl-group-containing cyclic siloxanes, such as tetravinyltetramethylcyclotetrasiloxane, or organic hydroxyl compounds containing terminal double or triple bonds, such as ethynylcyclohexanol, can also be used as inhibitors.

The vinyl-group-containing and SiH-group-containing solid or liquid MQ resins cited under i) are characterized in that they contain as the Q unit the quadrafunctional $SiO_{4/2}$ and as the M unit the monofunctional $R_3SiO_{1/2}$, where R can be vinyl, methyl, ethyl or phenyl. Furthermore, the trifunctional $RSiO_{3/2}$ can also be present as T units and the difunctional $R_2SiO_{2/2}$ as D units, R having the same meaning as cited in the foregoing. These MQ resins can be present in dissolved form in organopolysiloxanes having two or more vinyl groups in the molecule and a viscosity of 21 to 350,000 MPa·s. The vinyl-group content of the said MQ resins is preferably in the range of 0.1 to 8 mmol/g and the ethoxy group content is lower than 4 mmol/g. Furthermore, the SiOH content of the MQ resins should be sufficiently low that gases are not formed by hydrogen evolution. Also, the content of volatile constituents of the MQ resins should be as low as possible, to ensure that dimensional stability is not impaired.

The compounds j) that may be used are preferably composed of organopolysiloxanes having two or more vinyl groups in the molecule and a viscosity of 21 to 350,000 MPa·s as well as of the reinforcing fillers cited under d). Particularly preferably, there are used compounds hydrophobed in situ by means of modifiers, such as hexamethyldisilazane.

The components k) that may be used as a surfactant, emulsifier and/or stabilizer can be anionic surfactants, especially alkyl sulfates, alkylbenzenesulfonates and alkylbenzenephosphates, cationic surfactants, especially tetraalkylammonium halides, nonionic surfactants, especially alkyl and alkylphenyl-polyalkylalkylene oxides and their alkyl ethers and alkyl esters, fatty acid alkylolamides, sucrose fatty acid esters, trialkylamine oxides, silicone surfactants or fluoro surfactants as well as amphoteric surfactants, especially sulfated or oxyethylated condensation products of alkylenephenols and formaldehyde, ethylene oxide/propylene oxide block polymers and modified polysiloxanes. Furthermore, the surfactants can also contain functional groups, such as —OH, —CH=$CH_2$, —OCO—($CH_3$)C=$CH_2$ and SiH. Above and beyond those, it is obvious that all other compounds known to the person skilled in the art for this purpose can be used, even if not preferably.

As examples of radioopaque substances l), the inventive two-component silicone materials can be provided with glasses that contain barium, strontium, lanthanum or zinc; barium sulfate, zirconium dioxide, lanthanum dioxide; or ceramic filler compositions that contain oxides of lanthanum, hafnium and rare earth metals. Furthermore, complex heavy metal fluorides of the general formula $M^{II}M^{IV}F_6$ or $YF_3$ can be used for this purpose, where $M^{II}$ can be in particular a calcium, strontium or barium ion and $M^{IV}$ can be in particular a titanium, zirconium or hafnium ion. There can also be used as the radioopaque substances atoms or atomic groups bound to the silicone polymer and having radioopaque properties. One example is iodine bound to silicon.

The $H_2$ absorbers/adsorbers cited under m) are preferably finely divided palladium or platinum or alloys thereof, which if necessary are contained in aluminosilicates. Furthermore, substances that eliminate or reduce $H_2$ evolution can also be used, such as 3-methyl-1-butyn-3-ol and $CH_3Si$[O—C($CH_3$)$_2$—C≡CH]$_3$.

As the compounds n) that enhance optical readability/scanning there can be used all substances known to the person skilled in the art for this purpose, especially metal powders, metal pigments, metallic pigments and titanium dioxide. Depending on their chemical nature, these are added to component A and/or to component B.

Preferably the inventive silicone material, or in other words the mixture of the two components of the addition-cross-linking 2-component system, contains the substances listed below in the proportion ranges indicated for each as wt % relative to the total silicone material.

$a_1$) more than 1 to 90 wt %, preferably 10 to 60 wt % of at least one organopolysiloxane of general formula I having at least two vinyl groups in the molecule and an Si-vinyl content of 0.7 to 10 mmol/g, preferably an Si-vinyl content of 0.8 to 9 mmol/g, $a_2$) 0 to 80 wt %, preferably 0 to 50 wt % of at least one organopolysiloxane having two vinyl groups in the molecule and a viscosity of between 100 and 350,000 mPa·s at 20° C. and/or at least one organopolysiloxane of general formula II, b) 1 to 90 wt %, preferably 10 to 60 wt % of an organopolysiloxane having at least two, preferably at least three SiH groups and an SiH content of 0.1 to 15 mmol/g, particularly preferably of 4 to 14 mmol/g and quite particularly preferably of 6 to 13 mmol/g, c) 0.0001 to 0.1 wt %, preferably 0.0005 to 0.05 wt %, relative to pure metal, of at least one catalyst for acceleration of the hydrosilylation reaction, d) 0 to 80 wt %, preferably 0 to 70 wt % and particularly preferably 0.5 to 50 wt % of reinforcing fillers, e) 0 to 90 wt %, preferably 0 to 80 wt % and particularly preferably 0.1 to 75 wt % of non-reinforcing fillers, f) 0 to 5 wt %, preferably 0 to 2 wt % of at least one dye, g) 0 to 30 wt %, preferably 0 to 5 wt % of moisture binders, h) 0 to 1 wt %, preferably 0 to 0.6 and particularly preferably 0 to 0.01 wt % of inhibitors, i) 0 to 80 wt %, preferably 0 to 50 wt % of at least one vinyl-group-containing MQ resin, j) 0 to 80 wt %, preferably 0 to 50 wt % of compounds of vinyl-group-containing organopolysiloxanes and reinforcing fillers, k) 0 to 10 wt %, preferably 0 to 5 wt % of surfactants, emulsifiers and/or stabilizers, l) 0 to 90 wt %, preferably 0 to 80 wt % of radioopaque substances, m) 0 to 20 wt %, preferably 0 to 10 wt % of $H_2$ absorbers/adsorbers or substances that reduce or eliminate $H_2$ evolution, as well as n) 0 to 20 wt %, preferably 0 to 10 wt % of compounds that enhance optical readability/scanning.

The inventive two-component silicone materials are characterized in the fully vulcanized condition by a high final Shore D hardness and/or by a high modulus of elasticity together with short setting time. Because also of their excellent hydrolysis resistance in particular, these compositions are therefore suitable for all applications in dental medicine and dental technology in which high final hardness and low elasticity of the material is required. In particular, the inventive materials are suitable for bite registration, as cement, as temporary crowns, as bridge material and as temporary as well as permanent filling material.

The invention will be explained hereinafter by means of examples that demonstrate the ideas of the invention but are non-limitative.

SYNTHESIS EXAMPLE 1

Synthesis of 1,5-divinyl-3,3-diphenyl-1,1,5,5-tetramethyltrisiloxane [ViMe$_2$SiO)$_2$Ph$_2$Si]

1$^{st}$ Synthesis Step: Synthesis of Vinyldimethylacetoxysilane (ViMe$_2$SiOAc)

Sodium acetate was slurried with dry tetraglyme in a vessel and then subjected to 3 cycles of evacuation and aeration with nitrogen. Under a nitrogen atmosphere, 1 mol of vinyldimethylchlorosilane was slowly added dropwise, during which the temperature rose from RT to about 50° C. After 2 hours of stirring at 60° C., the too-viscous mixture was further diluted with tetraglyme. Direct distillation from the mixture at a head temperature of 120° C. (900 mbar) to 60° C. (50 mbar) yielded 380 g of distillate. Gas-chromatographic analysis indicated that the distillate contained 75% of vinyldimethylacetoxysilane and 18% of divinyltetramethyldisiloxane—corresponding to a yield of 72% of theory.

2$^{nd}$ Synthesis Step: Synthesis of (ViMe$_2$SiO)$_2$Ph$_2$Si

To a mixture of 1 mol of ViMe$_2$SiOAc and 0.48 mol of Ph$_2$Si(OMe)$_2$ as silanes in a vessel there was slowly added HCl (10%) dropwise at RT with vigorous stirring, during which the temperature rose slowly to 55° C. After subsequent heating of the mixture under reflux at 72° C. for 10 minutes and slow cooling to RT, there was obtained a two-phase mixture. The upper phase was separated and washed with 1×H$_2$O, 1×NaHCO$_3$ solution and 3×H$_2$O. After drying with molecular sieve and filtration, distillation was carried out, during which methyl acetate and divinyltetramethyldisiloxane passed over in initial fractions and the product distilled at 5 mbar and 160° C.—corresponding to a yield of 70% of theory.

SYNTHESIS EXAMPLE 2

Synthesis of Tetrakis(vinyldimethylsiloxy)silane

To a mixture of 2 mol of ViMe$_2$SiOAc and 0.48 mol of Si(OEt)$_4$ as silanes in a vessel there was slowly added HCl (10%) dropwise at RT with vigorous stirring, during which the temperature rose slowly to 55° C. After subsequent heating of the mixture under reflux at 72° C. for 10 minutes and slow cooling to RT, there was obtained a two-phase mixture. The upper phase was separated and washed with 1×H$_2$O, 1×NaHCO$_3$ solution and 3×H$_2$O. After drying with molecular sieve and filtration, distillation was carried out, during which methyl acetate and divinyltetramethyldisiloxane passed over in initial fractions and the product distilled—corresponding to a yield of 72% of theory.

SYNTHESIS EXAMPLE 3

Synthesis of Tris(vinyldimethylsiloxy)methylsilane

To a mixture of 1.5 mol of ViMe$_2$SiOAc and 0.48 mol of MeSi(OEt)$_3$ as silanes in a vessel there was slowly added HCl (10%) dropwise at RT with vigorous stirring, during which the temperature rose slowly to 55° C. After subsequent heating under reflux at 72° C. for 10 minutes and slow cooling to RT, there was obtained a two-phase mixture. The upper phase was separated and washed with 1×H$_2$O, 1×NaHCO$_3$ solution and 3×H$_2$O. After drying with molecular sieve and filtration, distillation was carried out, during which methyl acetate and divinyltetramethyldisiloxane passed over in initial fractions and the product distilled—corresponding to a yield of 72% of theory.

SYNTHESIS EXAMPLE 4

Synthesis of Tetrakis(dimethylsiloxy)silane

1$^{st}$ Synthesis Step: Synthesis of Dimethylacetoxysilane(HMe$_2$SiOAc)

1.03 mol of sodium acetate was slurried with ethylbenzene in a vessel, evacuated three times and purged with nitrogen. Then 1 mol of dimethylchlorosilane was added dropwise, during which the temperature rose to about 60° C. After 2 hours of stirring at 60° C., distillation was carried out directly from the mixture. At normal pressure and a head temperature of 83-95° C., a fraction containing 70% of product—corresponding to a yield of 59% of theory—passed over.

2$^{nd}$ Synthesis Step: Synthesis of Tetrakis(dimethylsiloxy)silane ("SiH Star")

To a mixture of 1 mol (208.3 g) of tetraethoxysilane and 4.2 mol (496 g) of dimethylacetoxysilane as silanes in a vessel there was added 70 g of 10% hydrochloric acid dropwise at a moderately fast rate. At first, the temperature of the mixture rose slowly from RT to 56° C., at which point boiling began, after which it rose further to 71° C. and the mixture became cloudy. After addition of the hydrochloric acid, the mixture cooled slowly to RT. The lower phase obtained was separated and the upper phase was washed with 1× water, 1×NaHCO$_3$ solution and 3× water.

After drying over molecular sieve and filtration, distillation was carried out, leading to the following fractions:

1$^{st}$ fraction: ethyl acetate at 1013 mbar/58° C.,

2$^{nd}$ fraction: TMDSO at 160 mbar/80° C.,

3$^{rd}$ fraction: product at 160 mbar/130° C., corresponding to a yield of 85% of theory.

EXAMPLE 1

In a closed kneader, 125 parts of 1,5-divinyl-3,3-diphenyltetramethyltrisiloxane was mixed homogeneously for 1.5 hours with 330 parts of quartz powder having a mean particle size of 10 μm, 15 parts of a pyrogenic, highly disperse, hydrophobed silica having a BET surface of 200 m$^2$/g and 2 parts of a platinum catalyst having a pure platinum content of 1%. The mixture was then degassed in vacuum for 15 minutes.

A medium-viscosity paste (ISO 4823, formerly DIN EN 24823) was obtained. The paste represents component A of the inventive two-component silicone material according to a first practical example. After storage at 23° C. for one month, the viscosity and reactivity were in the specified range.

EXAMPLE 2

In a closed kneader, 100 parts of 1,5-divinyl-3,3-diphenyltetramethyltrisiloxane was mixed homogeneously for 1.5 hours with 40 parts of a polymethylhydrosiloxane having a viscosity of 30 mPa·s and an SiH content of 9.3 mmol/g, 350 parts of quartz powder and 15 parts of a pyrogenic, highly disperse, hydrophobed silica having a BET surface of 200 m²/g. The mixture was then degassed in vacuum for 15 minutes.

A medium-viscosity paste (ISO 4823) was obtained. The paste represents component B of the inventive two-component silicone material. After storage at 23° C. for one month, the viscosity and reactivity were in the specified range.

EXAMPLE 3

50 parts of component A described in Example 1 and 50 parts of component B described in Example 2 were squeezed out of a cartridge (Mixpac Co.) and homogeneously mixed by means of a static mixer (Mixpac Co.).

The product remained processable for about 30 seconds at room temperature, while at a temperature of 35° C. it cured within about 10 minutes after the start of mixing. As the vulcanized product there were obtained hard moldings that were difficult to compress but could be cut. A Shore D hardness of 86 was determined with the Shore D Durometer 3100 of the Zwick Co.

In the tension test (DIN 53455), the modulus of elasticity, measured after 2 hours at 37° C., was 398 MPa. An S2 shouldered bar according to DIN 53455 was used as the test specimen, and the modulus of elasticity was calculated as the secant modulus between 0.1 and 0.8% elongation/compression, using the following equation:

$$E=[R(0.8\%)-R(0.1\%)]/(0.8\%-0.1\%).$$

EXAMPLE 4

In a closed kneader, 33 parts of 1,5-divinylhexamethyltrisiloxane was mixed homogeneously for 1.5 hours with 64 parts of quartz powder having a mean particle size of 10 μm, 2 parts of a pyrogenic, highly disperse, hydrophobed silica having a BET surface of 200 m²/g and 1 part of a platinum catalyst having a pure platinum content of 1%. The mixture was then degassed in vacuum for 15 minutes.

A medium-viscosity paste (ISO 4823) was obtained. The paste represents component A of the inventive two-component silicone material according to a second practical example. After storage at 23° C. for one month, the viscosity and reactivity were in the specified range.

EXAMPLE 5

In a closed kneader, 39 parts of a polymethylhydrosiloxane having a viscosity of 30 mPa·s and an SiH content of 9.3 mmol/g, 60 parts of quartz powder and 1 part of a pyrogenic, highly disperse, hydrophobed silica having a BET surface of 200 m²/g were mixed homogeneously for 1.5 hours. The mixture was then degassed in vacuum for 15 minutes.

A medium-viscosity paste (ISO 4823) was obtained. The paste represents component B of the inventive two-component silicone material. After storage for one month at 23° C., the viscosity and reactivity were in the specified range.

EXAMPLE 6

50 parts of component A described in Example 4 and 50 parts of component B described in Example 5 were squeezed out of a cartridge (Mixpac Co.) and homogeneously mixed by means of a static mixer (Mixpac Co.).

The product remained processable for about 30 seconds at room temperature, while at a temperature of 35° C. it cured within about 4 minutes after the start of mixing. As the vulcanized product there were obtained hard moldings that were difficult to compress but could be readily cut. After 2 hours at 37° C., Shore D hardness of 68 was determined with the Shore D Durometer 3100 of the Zwick Co.

In the tension test (DIN 53455), the modulus of elasticity, measured after 2 hours at 37° C., was 119 MPa. The modulus of elasticity was determined and calculated as described in Example 3.

From this example it is evident that divinyltrisiloxane in no way acts as an inhibitor in the manner described in the prior art, but instead is suitable for cross-linking at room temperature and mouth temperature in order to obtain the inventive, hard silicone materials.

EXAMPLE 7

In a closed kneader, 59 parts of 1,5-divinyl-3,3-diphenyl-1,1,5,5-tetramethyltrisiloxane from Synthesis Example 1, 40 parts of a pyrogenic, highly disperse, hydrophobed silica having a BET surface of 170 m²/g and 1 part of a platinum catalyst having a pure platinum content of 1% were mixed homogeneously for 1.5 hours. The mixture was then degassed in vacuum for 15 minutes.

A transparent, medium-viscosity paste (ISO 4823) was obtained. The paste represents component A of the inventive two-component silicone material according to a third practical example. After storage at 23° C. for one month, the viscosity and reactivity were in the specified range.

EXAMPLE 8

In a closed kneader, 5 parts of 1,5-divinyl-3,3-diphenyl-1,1,5,5-tetramethyltrisiloxane from Synthesis Example 1 was homogenized for 1.5 hours with 72 parts of a polymethylhydrosiloxane having a viscosity of 30 mPa·s (measured at 20° C.) and an SiH content of 9.3 mmol/g and 30 parts of a pyrogenic, highly disperse, hydrophobed silica having a BET surface of 170 m²/g. The mixture was then degassed in vacuum for 15 minutes.

A transparent, medium-viscosity paste (ISO 4823) was obtained. The paste represents component B of the inventive two-component silicone material.

After storage at 23° C. for one month, the viscosity and reactivity were in the specified range.

EXAMPLE 9

50 parts of component A described in Example 7 and 50 parts of component B described in Example 8 were squeezed out of a cartridge (Mixpac Co.) and homogeneously mixed by means of a static mixer (Mixpac Co.).

The product remained processable for about 60 seconds at room temperature, while at a temperature of 35° C. it cured within about 4 minutes after the start of mixing. As the vulcanized product there were obtained transparent, hard moldings that were difficult to compress but could be cut.

After the test specimens had been stored for 24 hours in water at 37° C., the following mechanical characteristics were determined:

| | |
|---|---|
| Shore D hardness (DIN 53505): | 86 |
| Modulus of elasticity in the 3-point bend test (ISO 10477): | 224 MPa |
| Bending strength (ISO 10477): | 6.7 MPa |

Each of the above measured values is an average value of tests on five test specimens.

The modulus of elasticity in the 3-point bend test was calculated as the secant modulus between 0.05% and 0.25% bending, using the following formula:

Modulus of elasticity=$[L_v^3*(X_H-X_L)]/(4*\text{delta-}L*b_0*a_0^3)$

The bending strength was calculated according to the following formula:

Bending strength=$[(1.5*L_v)/(b_0*a_0^2)]*F$, where

| | |
|---|---|
| $a_0$: | specimen thickness |
| $b_0$: | specimen width |
| $L_V$: | support span |
| $X_H$: | force at end of determination of modulus of elasticity |
| $X_L$: | force at beginning of determination of modulus of elasticity |
| delta-L: | deflection between $X_H$ and $X_L$ |
| F: | force at break of specimen |

As the test specimen there was used a flat/strip specimen having the following dimensions:

Specimen thickness $a_0$=2 mm, specimen width $b_0$=2 mm, specimen length=25 mm. The support span was Lv=20 mm.

EXAMPLE 10

In a closed kneader, 30 parts of 1,5-divinyl-1,1,3,3,5,5-hexamethyltrisiloxane was homogenized for 1.5 hours with 67 parts of quartz powder having a mean particle size of 10 μm, 2 parts of a pyrogenic, highly disperse, hydrophobed silica having a BET surface of 170 m²/g and 1 part of a platinum catalyst having a pure platinum content of 1%. The mixture was then degassed in vacuum for 15 minutes.

A medium-viscosity paste (ISO 4823) was obtained. The paste represents component A of the inventive two-component silicone material according to a fourth practical example. After storage at 23° C. for one month, the viscosity and reactivity were in the specified range.

EXAMPLE 11

In a closed kneader, 34 parts of a polymethylhydrosiloxane having a viscosity of 30 mPa·s (measured at 20°) and an SiH content of 9.3 mmol/g, 64 parts of quartz powder and 2 parts of a pyrogenic, highly disperse, hydrophobed silica having a BET surface of 170 m²/g were homogenized for 1.5 hours. The mixture was then degassed in vacuum for 15 minutes.

A medium-viscosity paste (ISO 4823) was obtained. The paste represents component B of the inventive two-component silicone material. After storage at 23° C. for one month, the viscosity and reactivity were in the specified range.

EXAMPLE 12

50 parts of component A described in Example 10 and 50 parts of component B described in Example 11 were squeezed out of a cartridge (Mixpac Co.) and homogeneously mixed by means of a static mixer (Mixpac Co.).

The product remained processable for about 30 seconds at room temperature, while at a temperature of 35° C. it cured within about 3 minutes after the start of mixing. As the vulcanized product there were obtained hard moldings that were difficult to compress but could be readily cut.

After the test specimens had been stored for 24 hours in water at 37° C., the following mechanical characteristics were determined:

| | |
|---|---|
| Shore D hardness (DIN 53505): | 82 |
| Modulus of elasticity in the 3-point bend test (ISO 10477): | 956 MPa |
| Bending strength (ISO 10477): | 15.6 MPa |

The modulus of elasticity in the 3-point bend test and the bending strength were determined and calculated as described in Example 9.

COMPARISON EXAMPLE 1

In a kneader, 42 parts of 1,3-divinyltetramethyltrisiloxane, 55 parts of quartz powder having a particle size of 10 μm, 2 parts of a pyrogenic, highly disperse, hydrophobed silica having a BET surface of 200 m²/g and 1 part of a platinum catalyst having a pure platinum content of 1% were mixed homogeneously for 1.5 hours. The mixture was then degassed in vacuum for 15 minutes.

A medium-viscosity paste (ISO 4823) was obtained. The paste represents component A of a two-component silicone material that is not in conformity with the invention. After storage for one month at 23° C., the viscosity and reactivity were in the specified range.

COMPARISON EXAMPLE 2

In a kneader, 34 parts of a polymethylhydrosiloxane having a viscosity of 30 mPa·s and an SiH content of 9.3 mmol/g, 64 parts of quartz powder and 2 parts of a pyrogenic, highly disperse, hydrophobed silica having a BET surface of 200 m²/g were mixed homogeneously for 1.5 hours. The mixture was then degassed in vacuum for 15 minutes.

A medium-viscosity paste (ISO 4823) was obtained. The paste represents component B of a two-component silicone material that is not in conformity with the invention. After storage for one month at 23° C., the viscosity and reactivity were in the specified range.

COMPARISON EXAMPLE 3

33 parts of component A described in Comparison Example 1 and 67 parts of component B described in Comparison Example 2 were squeezed out of a cartridge (Mixpac Co.) and homogeneously mixed by means of a static mixer (Mixpac Co.).

The product set slowly within 1.5 hours. As the vulcanized product there were obtained hard moldings that were difficult to compress. After 2 hours at 37° C., a Shore D hardness of 60 was determined with the Shore D Durometer 3100 of the Zwick Co.

In the tension test (DIN 53455), the modulus of elasticity, measured after 2 hours at 37° C., was 34 MPa. The modulus of elasticity was determined and calculated as described in Example 3.

Comparison Examples 1 to 3 illustrate that disiloxanes act as inhibitors and thus are not suitable for cross-linking at room temperature and mouth temperature.

Furthermore, comparison of Example 6 (divinyltrisiloxane) with Comparison Example 3 (divinyldisiloxane) shows how surprisingly sharp is the boundary between inhibiting disiloxane and non-inhibiting but cross-linking trisiloxane. Thus the compound divinyldisiloxane is the simplest and classical representative of an inhibitor, whereas divinyltrisiloxane is the simplest and shortest-chain representative of the organopolysiloxanes of general formula I that can be used according to the invention.

COMPARISON EXAMPLE 4

In a kneader, 140 parts of a vinyl-terminated polydimethylsiloxane having a viscosity of 1,000 mPa·s at 20° C., 10 parts of a vinyl-group-containing MQ resin dissolved in a vinyl-terminated polydimethylsiloxane having a total viscosity of 6,000 mPa·s at 20° C., 10 parts of a pyrogenic, highly disperse, hydrophobed silica having a BET surface of 200 $m^2/g$, 350 parts of aluminum hydroxide and 1.5 parts of a platinum catalyst having a pure platinum content of 1% were mixed homogeneously for 1.5 hours. The mixture was then degassed in vacuum for 15 minutes.

A medium-viscosity paste (ISO 4823) was obtained. The paste represents component A of a two-component silicone material that is not in conformity with the invention. After storage for one month at 23° C., the viscosity and reactivity were in the specified range.

COMPARISON EXAMPLE 5

In a kneader, 100 parts of a vinyl-terminated polydimethylsiloxane having a viscosity of 1,000 mPa·s at 20° C., 10 parts of a vinyl-group-containing MQ resin dissolved in a vinyl-terminated polydimethylsiloxane having a total viscosity of 6,000 mPa·s at 20° C., 40 parts of a polymethylhydrosiloxane having a viscosity of 50 mPa·s and an SiH content of 2.3 mmol/g, 350 parts of aluminum hydroxide and 12 parts of a pyrogenic, highly disperse, hydrophobed silica having a BET surface of 200 $m^2/g$ were mixed homogeneously for 1.5 hours. The mixture was then degassed in vacuum for 15 minutes.

A medium-viscosity paste (ISO 4823) was obtained. The paste represents component B of a two-component silicone material that is not in conformity with the invention. After storage for one month at 23° C., the viscosity and reactivity were in the specified range.

COMPARISON EXAMPLE 6

50 parts of component A described in Comparison Example 4 and 50 parts of component B described in Comparison Example 5 were squeezed out of a cartridge (Mixpac Co.) and homogeneously mixed by means of a static mixer (Mixpac Co.).

As the vulcanized product there were obtained medium-hard and elastically deformable moldings. It was not possible in practice to measure a Shore D hardness. A Shore A hardness of 70 was determined with the Shore A Durometer of the Zwick Co.

The modulus of elasticity was 4.4 MPa in the compression test (based on DIN 53457) and 5 MPa in the tension test (DIN 53455). The modulus of elasticity was calculated as described in Example 3, using the following test specimens: 50 mm length, 10 mm diameter, 15 mm gauge length "1"; shape of test specimen: cylinder.

Comparison Examples 4 to 6 illustrate that, in contrast to the organopolysiloxanes of general formula I that can be used according to the invention, only silicone materials with low final hardness and low modulus of elasticity are obtained with the conventionally used organopolysiloxanes.

COMPARISON EXAMPLE 7

A commercial bite-registration material based on addition-cross-linking silicones was mixed in accordance with the manufacturer's instructions and allowed to set.

The material obtained in this way had a Shore A hardness of 85, determined with the Shore A durometer of the Zwick Co., and a Shore D hardness of 28, determined with the Shore D durometer of the Zwick Co.

The modulus of elasticity was 13.1 MPa in the compression test based on DIN 53457, and 6.9 MPa in the tension test (DIN 53455).

COMPARISON EXAMPLE 8

Memosil 2, a transparent bite-registration material of the Hereaus Kulzer Co. (from the manufacturer's data: extra hard; commercial product based on the compositions disclosed in European Patent 0522341 A1), based on addition-cross-linking silicones, was mixed in accordance with the manufacturer's instructions and allowed to set.

The material obtained in this way had a Shore A hardness of 78, determined with the Shore A durometer of the Zwick Co., and a Shore D hardness of 19, determined with the Shore D durometer of the Zwick Co.

Comparison Examples 7 and 8 illustrate that bite-registration materials based on addition-cross-linking silicones according to the prior art have much lower hardness and a lower modulus of elasticity than do the inventive two-component silicone materials.

COMPARISON EXAMPLE 9

In a kneader, 42 parts of 1,3-divinyl-1,1,3,3-tetramethyldisiloxane, 55 parts of quartz powder having a particle size of 10 μm, 2 parts of a pyrogenic, highly disperse, hydrophobed silica having a BET surface of 170 $m^2/g$ and 1 part of a platinum catalyst having a pure platinum content of 1% were mixed homogeneously for 1.5 hours. The mixture was then degassed in vacuum for 15 minutes.

A medium-viscosity paste (ISO 4823) was obtained. The paste represents component A of a two-component silicone material that is not in conformity with the invention.

COMPARISON EXAMPLE 10

In a kneader, 37 parts of a polymethylhydrosiloxane having a viscosity of 30 mPa·s (measured at 20° C.) and an SiH content of 9.3 mmol/g, 61 parts of quartz powder having a mean particle size of 10 μm and 2 parts of a pyrogenic, highly disperse, hydrophobed silica having a BET surface of 170 $m^2/g$, were homogenized for 1.5 hours. The mixture was then degassed in vacuum for 15 minutes.

A medium-viscosity paste (ISO 4823) was obtained. The paste represents component B of a two-component silicone material that is not in conformity with the invention.

After storage at 23° C. for one month, the viscosity and reactivity were in the specified range.

COMPARISON EXAMPLE 11

33 parts of component A described in Comparison Example 9 and 67 parts of component B described in Comparison Example 10 were squeezed out of a cartridge (Mixpac Co.) and homogeneously mixed by means of a static mixer (Mixpac Co.).

The product set very slowly and was processable at room temperature for 1.5 hours. After 24 hours at room temperature, hard, very brittle moldings were obtained.

After the test specimens had been stored for 24 hours in water at 37° C., the following mechanical characteristics were determined:

| | |
|---|---|
| Shore D hardness (DIN 53505): | 60 |
| Modulus of elasticity in the bend test (ISO 10477): | 34 MPa |
| Bending strength (ISO 10477): | 1.3 MPa |

The modulus of elasticity in the 3-point bend test and the bending strength were determined and calculated as described in Example 9.

Comparison Examples 9 to 11 also illustrate that disiloxanes act as inhibitors and thus are not suitable for cross-linking at room temperature and mouth temperature.

Furthermore, comparison of Example 6 (divinyltrisiloxane) with Comparison Example 11 (divinyldisiloxane) also shows how surprisingly sharp is the boundary between the inhibiting disiloxane and the non-inhibiting but cross-linking trisiloxane.

Thus the compound divinyldisiloxane is the simplest and classical representative of an inhibitor, whereas divinyltrisiloxane is the simplest and shortest-chain representative of the organopolysiloxanes of general formula I that can be used according to the invention.

COMPARISON EXAMPLE 12

A commercial bite-registration material based on addition-cross-linking vinylpolysiloxanes was mixed in accordance with the manufacturer's instructions and allowed to set.

The product remained processable for about 30 seconds at room temperature, while at a temperature of 35° C. it set completely within about two minutes after the start of mixing.

As the vulcanized product there were obtained readily cuttable moldings.

After the test specimens had been stored for 24 hours in water at 37° C., the following mechanical characteristics were determined:

| | |
|---|---|
| Shore D hardness (DIN 53505): | 43 |
| Modulus of elasticity in the 3-point bend test (ISO 10477): | 38 MPa |
| Bending strength (ISO 10477): | 8.7 MPa |

The modulus of elasticity in the 3-point bend test and the bending strength were determined and calculated as described in Example 9.

This example should illustrate that bite-registration materials based on addition-cross-linking vinylpolysiloxanes according to the prior art have much lower hardness and modulus of elasticity.

The results of the individual examples and comparison examples are summarized in Tables 1 and 2.

TABLE 1

| Example | Modulus of elasticity[1] | Stress at break[1] | Shore D[1] | Shore A[1] | Setting time | Vinyl content (mmol/g)[3]/[4] |
|---|---|---|---|---|---|---|
| Ex. 3 | 398 MPa | 783 N/cm² | 86 | >95 | 4 min | 5.2/1.2 |
| Ex. 6 | 119 MPa | 268 N/cm² | 68 | >95 | 6 min | 7.7/1.3 |
| Comp. Ex. 3 | 34 MPa | 131 N/cm² | 60 | >95 | 1.5 h | 10.8/2.3 |
| Comp. Ex. 6 | 5 MPa | 281 N/cm² | (2) | 70 | 4 min | 0.03 |
| Comp. Ex. 7 | 6.9 MPa | 502 N/cm² | 28 | 85 | 2.5 min | n.d. |
| Comp. Ex. 8 | 8.6 MPa | 533 N/cm² | 19 | 78 | 4 min | n.d. |

Ex.: Example
Comp. Ex.: Comparison Example
[1] after 2 h at 37° C.
[2] not measurable in practice
[3] vinyl content of the compound according to general formula I
[4] total vinyl content of the composition
n.d. not definable

TABLE 2

| Example | Modulus of elasticity[1] in the 3-point bend test | Bending strength[1] | Shore D[1] | Shore A[1] | Setting time | Vinyl content (mmol/g)[3]/[4] |
|---|---|---|---|---|---|---|
| Ex. 9 | 224 MPa | 6.7 MPa | 86 | >95 | 4 min | 5.2/1.66 |
| Ex. 12 | 956 MPa | 15.6 MPa | 82 | >95 | 3 min | 7.69/1.15 |
| Comp. Ex. 11 | 34 MPa | 1.3 MPa | 60 | >95 | 24 h | 10.79/1.48 |
| Comp. Ex. 12 | 38 MPa | 8.7 MPa | 43 | >95 | 2 min | 0.6/0.14 |

Ex.: Example
Comp. Ex.: Comparison Example
[1] after 2 h at 37° C.
[2] not measurable in practice
[3] vinyl content of the compound according to general formula I
[4] total vinyl content of the composition
n.d. not definable

The invention claimed is:

1. An addition-cross-linking two-component silicone material consisting essentially of
   a) an organopolysiloxane having at least two vinyl groups in the molecule or a mixture of two or more organopolysiloxanes, each having different chain length and each having at least two vinyl groups in the molecule, as well as
   b) at least one organohydropolysiloxane having two or more SiH groups in the molecule and
   c) at least one catalyst, wherein the organopolysiloxane is an organopolysiloxane of the general formula I $$CH_2=CH-SiR^1R^2O-(SiR^1R^2O)_n-SiR^1R^2-CH=CH_2,$$

in which $R^1$ and $R^2$ are identical or different and are selected from the group comprising alkyl groups, aryl groups, aralkyl groups, halogen-substituted alkyl groups, halogen-substituted aralkyl groups, cyanoalkyl groups, cycloalkyl groups and cycloalkenyl groups, or wherein the mixture of two or more organopolysiloxanes contains, relative to the total quantity of the two-component silicone material, more than 1% by weight of at least one such organopolysiloxane of the general formula I,
   wherein the content of divinylorganodisiloxanes or of divinylorganodisiloxane substructures or of divinylorganodisiloxanes and of divinylorganodisiloxane substructures in said two-component silicone material is less than 0.6% by weight, relative to the total weight of the silicone material; and
   wherein the at least one organopolysiloxane of general formula I has a chain length n of between 1 and 5;
   d) 0 to 80% by weight of at least one reinforcing filler,
   e) 0 to 90% by weight of at least one non-reinforcing filler,
   f) 0 to 5% by weight of at least one dye,
   g) 0 to 30% by weight of at least one moisture binder,
   h) 0 to 1% by weight of at least one inhibitor,
   I) 0 to 80% by weight of at least one vinyl-group-containing or SiH-group containing MQ resin,
   j) 0 to 80% by weight of at least one compound of organopolysiloxanes and reinforcing fillers,
   k) 0 to 10% by weight of at least one surfactant, emulsifier or stabilizer,
   l) 0 to 90% by weight of at least one radioopaque substance,
   m) 0 to 20% by weight of at least one $H_2$ absorber or $H_2$ adsorber or substance that reduces or eliminates $H_2$ evolution, and
   n) 0 to 20% by weight of at least one compound that enhances optical readability/scanning.

2. A silicone material according to claim 1, wherein the at least one reinforcing filler has a BET surface of at least 50 $m^2/g$, selected from the group comprising titanium dioxide, aluminum oxide, zinc oxide, zirconium oxide and wet-precipitated and pyrogenic silicas.

3. The silicone material according to claim 1, wherein the at least one organopolysiloxane of general formula I has a chain length n of between 1 and 3.

4. The silicone material according to claim 1, wherein the silicone material in the fully vulcanized condition has a Shore D hardness of at least 45 and/or a modulus of elasticity (measured according to DIN 53457 or 53455) of higher than 100 MPa, and/or a modulus of elasticity measured in the 3-point bend test according to ISO 10477 of higher than 100 MPa.

5. The silicone material according to claim 1, wherein the silicone material in a fully vulcanized condition has a Shore D hardness of at least 55 and/or a modulus of elasticity measured in the 3-point bend test according to ISO 10477 of higher than 200 MPa.

6. The silicone material according to claim 3, comprising only one organopolysiloxane according to general formula I.

7. A silicone material according to claim 6, wherein the mixture of two or more organopolysiloxanes a) contains, besides the one organopolysiloxane of general formula I, at least one organopolysiloxane of general formula II $$CH_2=CH-SiR^1R^2O-(SiR^1R^2O)_{n'}-SiR^1R^2-CH=CH_2,$$

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and
   n' is an integral number between 10 and 69.

8. A silicone material according to claim 6, wherein the silicone material in the fully vulcanized condition has a Shore D hardness of at least 35 and/or a modulus of elasticity (measured according to DIN 53457 or 53455) of higher than 20 MPa and/or a modulus of elasticity measured in the 3-point bend test according to ISO 10477 of higher than 20 Mpa.

9. The silicone material according to claim 6, wherein the silicone material in the fully vulcanized condition has a Shore D hardness of at least 45 and/or a modulus of elasticity (measured according to DIN 53457 or 53455) of higher than 100 MPa, and/or a modulus of elasticity measured in the 3-point bend test according to ISO 10477 of higher than 100 MPa.

10. The silicone material according to claim 6, wherein the silicone material in a fully vulcanized condition has a Shore D hardness of at least 55 and/or a modulus of elasticity measured in the 3-point bend test according to ISO 10477 of higher than 200 MPa.

11. An addition-cross-linking two-component silicone material for the preparation of a cured silicone material having in a fully vulcanized condition a Shore D hardness of higher than 50 or a modulus of elasticity of higher than 100 MPa or a Shore D hardness of higher than 50 and a modulus of elasticity of higher than 100 MPa, said addition-cross-linking two-component silicone material containing
   a) an organopolysiloxane having at least two vinyl groups in the molecule or a mixture of two or more organopolysiloxanes, each having different chain length and each having at least two vinyl groups in the molecule, as well as
   b) at least one organohydropolysiloxane having two or more SiH groups in the molecule and
   c) at least one catalyst, wherein the organopolysiloxane is an organopolysiloxane of the general formula I $$CH_2=CH-SiR^1R^2O-(SiR^1R^2O)_n-SiR^1R^2-CH=CH_2,$$

in which $R^1$ and $R^2$ are identical or different and are selected from the group comprising alkyl groups, aryl groups, aralkyl groups, halogen-substituted alkyl groups, halogen-substituted aralkyl groups, cyanoalkyl groups, cycloalkyl groups and cycloalkenyl groups,
   or wherein the mixture of two or more organopolysiloxanes contains, relative to the total quantity of the two-component silicone material, more than 1% by weight of at least one such organopolysiloxane of the general formula I, wherein the content of divinylorganodisiloxanes or of divinylorganodisiloxane substructures or of divinylorganodisiloxanes and of divinylorganodisiloxane substructures in said two-component silicone material is less than 0.6% by weight, relative to the total weight of the silicone material; and wherein the at least one organopolysiloxane of general formula I has a chain length n of between 1 and 5.

12. A silicone material according to claim 11, comprising a₁) more than 1 to 90 wt % of at least one organopolysiloxane of general formula I having at least two vinyl groups in the molecule and an Si-vinyl content of 0.7 to 10 mmol/g, a₂) 0 to 80 wt % of at least one organopolysiloxane having two vinyl groups in the molecule and a viscosity of between 100 and 350,000 mPa·s at 20° C. and/or at least one organopolysiloxane of general formula II

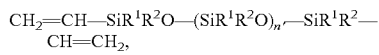
$CH_2=CH-SiR^1R^2O-(SiR^1R^2O)_{n'}-SiR^1R^2-CH=CH_2$, in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69, b) 1 to 90 wt % of an organopolysiloxane having at least two SiH groups and an SiH content of 0.1 to 15 mmol/g, c) 0.0001 to 0.1 wt %, relative to pure metal, of at least one catalyst for acceleration of the hydrosilylation reaction, d) 0 to 80 wt % of reinforcing fillers, e) 0 to 90 wt % of non-reinforcing fillers, f) 0 to 5 wt % of at least one dye, g) 0 to 30 wt % of moisture binders, h) 0 to 1 wt % of inhibitors, I) 0 to 80 wt % of at least one vinyl-group-containing MQ resin, j) 0 to 80 wt % of compounds of vinyl-group-containing organopolysiloxanes and reinforcing fillers, k) 0 to 10 wt % of surfactants, emulsifiers and/or stabilizers, l) 0 to 90 wt % of radioopaque substances, m) 0 to 20 wt % of $H_2$ absorbers/adsorbers or substances that reduce or eliminate $H_2$ evolution, as well as n) 0 to 20 wt % of compounds that enhance optical readability/scanning.

13. The silicone material according to claim 11, wherein the at least one organopolysiloxane of general formula I has a chain length n of between 1 and 3.

14. The silicone material according to claim 11, comprising only one organopolysiloxane according to general formula I.

15. The silicone material according to claim 13, comprising only one organopolysiloxane according to general formula I.

16. A silicone material according to claim 14, wherein the mixture of two or more organopolysiloxanes a) contains, besides the one organopolysiloxane of general formula I, at least one organopolysiloxane of general formula II

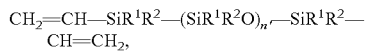
$CH_2=CH-SiR^1R^2-(SiR^1R^2O)_{n'}-SiR^1R^2-CH=CH_2$, in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69.

17. A silicone material according to claim 15, wherein the mixture of two or more organopolysiloxanes a) contains, besides the one organopolysiloxane of general formula I, at least one organopolysiloxane of general formula II

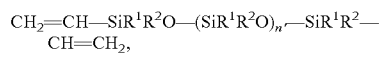
$CH_2=CH-SiR^1R^2O-(SiR^1R^2O)_{n'}-SiR^1R^2-CH=CH_2$, in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69.

18. A silicone material according to claim 13, comprising a₁) more than 1 to 90 wt % of at least one organopolysiloxane of general formula I having at least two vinyl groups in the molecule and an Si-vinyl content of 0.7 to 10 mmol/g, a₂) 0 to 80 wt % of at least one organopolysiloxane having two vinyl groups in the molecule and a viscosity of between 100 and 350,000 mPa·s at 20° C. and/or at least one organopolysiloxane of general formula II

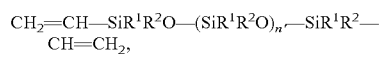
$CH_2=CH-SiR^1R^2O-(SiR^1R^2O)_{n'}-SiR^1R^2-CH=CH_2$, in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69, b) 1 to 90 wt % of an organopolysiloxane having at least two SiH groups and an SiH content of 0.1 to 15 mmol/g, c) 0.0001 to 0.1 wt %, relative to pure metal, of at least one catalyst for acceleration of the hydrosilylation reaction, d) 0 to 80 wt % of reinforcing fillers, e) 0 to 90 wt % of non-reinforcing fillers, f) 0 to 5 wt % of at least one dye, g) 0 to 30 wt % of moisture binders, h) 0 to 1 wt % of inhibitors, I) 0 to 80 wt % of at least one vinyl-group-containing MQ resin, j) 0 to 80 wt % of compounds of vinyl-group-containing organopolysiloxanes and reinforcing fillers, k) 0 to 10 wt % of surfactants, emulsifiers and/or stabilizers, l) 0 to 90 wt % of radioopaque substances, m) 0 to 20 wt % of $H_2$ absorbers/adsorbers or substances that reduce or eliminate $H_2$ evolution, as well as n) 0 to 20 wt % of compounds that enhance optical readability/scanning.

19. The silicone material according to claim 14, wherein the silicone material in the fully vulcanized condition has a Shore D hardness of at least 55 and/or a modulus of elasticity measured in the 3-point bend test according to ISO 10477 of higher than 200 MPa.

20. The silicone material according to claim 15, wherein the silicone material in the fully vulcanized condition has a Shore D hardness of at least 55 and/or a modulus of elasticity measured in the 3-point bend test according to ISO 10477 of higher than 200 MPa.

21. An addition-cross-linking two-component silicone material having in a fully vulcanized condition a Shore D hardness of higher than 50 or a modulus of elasticity of higher than 100 MPa or a Shore D hardness of higher than 50 and a modulus of elasticity of higher than 100 MPa, said addition-cross-linking two-component silicone material containing a₁) at least one organopolysiloxane of general formula I

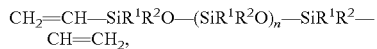

in which $R^1$ and $R^2$ are identical or different and are selected from the group comprising alkyl groups, aryl groups, aralkyl groups, halogen-substituted alkyl groups, halogen-substituted aralkyl groups, cyanoalkyl groups, cycloalkyl groups and cycloalkenyl groups, having at least two vinyl groups in the molecule and an Si-vinyl content of 0.8 to 9 mmol/g, wherein the at least one organopolysiloxane of general formula I has a chain length n of between 1 and 7, a₂) at least one organopolysiloxane having two vinyl groups in the molecule and a viscosity of between 100 and 350,000 mPa·s at 20° C. and/or at least one organopolysiloxane of general formula II

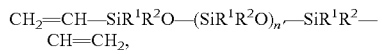

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69.

b) 10 to 60 wt % of an organohydropolysiloxane having at least three SiH groups in the molecule and an SiH content of 4 to 14 mmol/g, c) 0.0005 to 0.05 wt %, relative to pure metal, of at least one catalyst for acceleration of the hydrosilylation reaction, d) 0 to 70 wt % of reinforcing fillers, e) 0 to 80 wt % of non-reinforcing fillers, f) 0 to 2 wt % of at least one dye, g) 0 to 5 wt % of moisture binders, h) 0 to 0.6 wt % of inhibitors, I) 0 to 50 wt % of at least one vinyl-group-containing MQ resin, j) 0 to 50 wt % of compounds of vinyl-group-containing organopolysiloxanes and reinforcing fillers, k) 0 to 5 wt % of surfactants, emulsifiers and/or stabilizers, l) 0 to 80 wt % of radioopaque substances, m) 0 to 10 wt % of $H_2$ absorbers/adsorbers or substances that reduce or eliminate $H_2$ evolution, as well as n) 0 to 10 wt % of compounds that enhance optical readibility/scanning;

wherein the content of divinylorganodisiloxanes or of divinylorganodisiloxane substructures or of divinylorganodisiloxanes and of divinylorganodisiloxane substructures in said two-component silicone material is less than 0.6% by weight, relative to the total weight of the silicone material.

22. The silicone material according to claim 21, comprising only one organopolysiloxane according to general formula I.

23. A silicone material according to claim 22, wherein the mixture of two or more organopolysiloxanes a) contains, besides the one organopolysiloxane of general formula I, at least one organopolysiloxane of general formula II

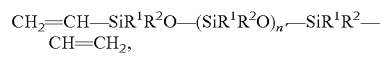

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69.

24. The silicone material according to claim 22, wherein the silicone material in the fully vulcanized condition has a Shore D hardness of at least 55 and/or a modulus of elasticity measured in the 3-point bend test according to ISO 10477 of higher than 200 MPa.

25. An addition-cross-linking two-component silicone material having in a fully vulcanized condition a Shore D hardness of higher than 50 or a modulus of elasticity of higher than 100 MPa or a Shore D hardness of higher than 50 and a modulus of elasticity of higher than 100 MPa, said addition-cross-linking two-component silicone material containing a₁) at least one organopolysiloxane of general formula I

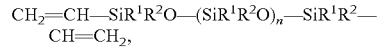

in which $R^1$ and $R^2$ are identical or different and are selected from the group comprising alkyl groups, aryl groups, aralkyl groups, halogen-substituted alkyl groups, halogen-substituted aralkyl groups, cyanoalkyl groups, cycloalkyl groups and cycloalkenyl groups, having at least two vinyl groups in the molecule and an Si-vinyl content of 0.7 to 10 mmol/g, wherein the at least one organopolysiloxane of general formula I has a chain length n of between 1 and 7, a₂) at least one organopolysiloxane having two vinyl groups in the molecule and a viscosity of between 100 and 350,000 mPa·s at 20° C. and/or at least one organopolysiloxane of general formula II

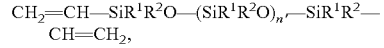

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69.

b) 1 to 90 wt % of an organohydropolysiloxane having at least three SiH groups in the molecule and an SiH content of 6 to 13 mmol/g, c) 0.0001 to 0.1 wt %, relative to pure metal, of at least one catalyst for acceleration of the hydrosilylation reaction, d) 0.5 to 50 wt % of reinforcing fillers, e) 0.1 to 75 wt % of non-reinforcing fillers, f) 0 to 5 wt % of at least one dye, g) 0 to 30 wt % of moisture binders,
h) 0 to 0.01 wt % of inhibitors,
I) 0 to 80 wt % of at least one vinyl-group-containing MQ resin,
j) 0 to 80 wt % of compounds of vinyl-group-containing organopolysiloxanes and reinforcing fillers,
k) 0 to 10 wt % of surfactants, emulsifiers and/or stabilizers,
l) 0 to 90 wt % of radioopaque substances,
m) 0 to 20 wt % of $H_2$ absorbers/adsorbers or substances that reduce or eliminate $H_2$ evolution, as well as
n) 0 to 20 wt % of compounds that enhance optical readibility/scanning;
   wherein the content of divinylorganodisiloxanes or of divinylorganodisiloxane substructures or of divinylorganodisiloxanes and of divinylorganodisiloxane substructures in said two-component silicone material is less than 0.6% by weight, relative to the total weight of the silicone material.

26. The silicone material according to claim 25, comprising only one organopolysiloxane according to general formula I.

27. A silicone material according to claim 26, wherein the mixture of two or more organopolysiloxanes a) contains, besides the one organopolysiloxane of general formula I, at least one organopolysiloxane of general formula II

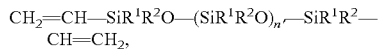

in which $R^1$ and $R^2$ are identical or different and are selected from the group comprising alkyl groups, aryl groups, aralkyl groups, halogen-substituted alkyl groups, halogen-substituted aryl groups, cyanoalkyl groups, cycloalkyl groups and cycloalkenyl groups, such as bicyclene or tricyclene, and n' is an integral number between 10 and 69.

28. The silicone material according to claim 26, wherein the silicone material in the fully vulcanized condition has a Shore D hardness of at least 55 and/or a modulus of elasticity measured in the 3-point bend test according to ISO 10477 of higher than 200 MPa.

29. A dental composition comprising a cured silicone material having in a fully vulcanized condition a Shore D hardness of higher than 50 or a modulus of elasticity of higher than 100 MPa or a Shore D hardness of higher than 50 and a modulus of elasticity of higher than 100 MPa, said cured silicone material being prepared from an addition-cross-linking two-component silicone material containing
a) an organopolysiloxane having at least two vinyl groups in the molecule or a mixture of two or more organopolysiloxanes, each having different chain length and each having at least two vinyl groups in the molecule, as well as
b) at least one organohydropolysiloxane having two or more SiH groups in the molecule and c) at least one catalyst, wherein the organopolysiloxane is an organopolysiloxane of the general formula I

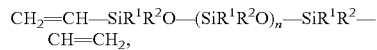

in which $R^1$ and $R^2$ are identical or different and are selected from the group comprising alkyl groups, aryl groups, aralkyl groups, halogen-substituted alkyl groups, halogen-substituted aralkyl groups, cyanoalkyl groups, cycloalkyl groups and cycloalkenyl groups, or wherein the mixture of two or more organopolysiloxanes contains, relative to the total quantity of the two-component silicone material, more than 1% by weight of at least one such organopolysiloxane of the general formula I, wherein the content of divinylorganodisiloxanes or of divinylorganodisiloxane substructures or of divinylorganodisiloxanes and of divinylorganodisiloxane substructures in said two-component silicone material is less than 0.6% by weight, relative to the total weight of the silicone material; and wherein the at least one organopolysiloxane of general formula I has a chain length n of between 1 and 5;

d) 0 to 80% by weight of at least one reinforcing filler,
e) 0 to 90% by weight of at least one non-reinforcing filler,
f) 0 to 5% by weight of at least one dye,
g) 0 to 30% by weight of at least one moisture binder,
h) 0 to 1% by weight of at least one inhibitor,
I) 0 to 80% by weight of at least one vinyl-group-containing MQ resin,
j) 0 to 80% by weight of at least one compound of organopolysiloxanes and reinforcing fillers,
k) 0 to 10% by weight of at least one surfactant, emulsifier or stabilizer,
l) 0 to 90% by weight of at least one radioopaque substance,
m) 0 to 20% by weight of at least one $H_2$ absorber or $H_2$ adsorber or substance that reduces or eliminates $H_2$ evolution, and
n) 0 to 20% by weight of at least one compound that enhances optical readibility/scanning.

30. A silicone material according to claim 1, wherein the silicone material in the fully vulcanized condition has a Shore D hardness of at least 35 and/or a modulus of elasticity (measured according to DIN 53457 or 53455) of higher than 20 MPa and/or a modulus of elasticity measured in the 3-point bend test according to ISO 10477 of higher than 20 MPa.

* * * * *